ically, US007739872B2

United States Patent
Murphy et al.

(10) Patent No.: US 7,739,872 B2
(45) Date of Patent: Jun. 22, 2010

(54) COOLED DUAL WALL LINER CLOSEOUT

(75) Inventors: Michael J. Murphy, Vernon, CT (US);
Jeffrey Lavin, Bloomfield, CT (US);
Jorge Farah, Glastonbury, CT (US);
Luis Coreano, Manchester, CT (US);
Henry Huizinga, Manchester, CT (US);
Andrew Burdick, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 963 days.

(21) Appl. No.: 11/057,892

(22) Filed: Feb. 14, 2005

(65) Prior Publication Data
US 2006/0179816 A1    Aug. 17, 2006

(51) Int. Cl.
*F02K 1/00*      (2006.01)
(52) U.S. Cl. ...................................... 60/770
(58) Field of Classification Search ............. 60/39.5, 60/770, 766, 752, 755, 756, 757, 758, 759, 60/760
See application file for complete search history.

(56) References Cited
U.S. PATENT DOCUMENTS

| | | | |
|---|---|---|---|
| 3,979,065 A | 9/1976 | Madden | |
| 4,171,093 A | 10/1979 | Honeycutt, Jr. et al. | |
| 4,512,159 A * | 4/1985 | Memmen | 60/752 |
| 4,718,230 A * | 1/1988 | Honeycutt et al. | 60/766 |
| 4,821,522 A * | 4/1989 | Matthews et al. | 60/757 |
| 4,864,818 A * | 9/1989 | Taylor | 60/766 |
| 5,221,048 A * | 6/1993 | Lair | 239/265.37 |
| 5,535,585 A | 7/1996 | Eichhorn | |
| 5,690,279 A * | 11/1997 | Kramer et al. | 239/127.3 |
| 6,109,663 A | 8/2000 | Hayton | |
| 6,199,371 B1 * | 3/2001 | Brewer et al. | 60/766 |
| 7,360,988 B2 * | 4/2008 | Lee et al. | 415/116 |
| 2003/0182929 A1 | 10/2003 | de Verduzan et al. | |
| 2005/0155352 A1 * | 7/2005 | Agg | 60/770 |

FOREIGN PATENT DOCUMENTS

| | | |
|---|---|---|
| EP | 0994304 A2 | 4/2000 |
| FR | 2271405 | 12/1975 |

OTHER PUBLICATIONS
Extended European Search Report dated Feb. 18, 2010 for EP 05257562.8.

* cited by examiner

*Primary Examiner*—Michael Cuff
*Assistant Examiner*—Gerald L Sung
(74) *Attorney, Agent, or Firm*—Carlson, Gaskey & Olds

(57) ABSTRACT

An example exhaust duct assembly includes a front liner, an intermediate liner and a rear liner. Each of the front, intermediate and rear liners include an inner liner exposed to combustion gases and an outer liner spaced radially apart from the inner liner. An air passage defined between the inner liner and the outer liner provides cooling air utilized for insulating an inner surface of the exhaust duct assembly. A closeout member is provided between the inner and outer liner and defines a portion of an air passage between the closeout member and the inner liner. Air flowing through the air passage is injected into a joint to provide cooling. The closeout member includes a horizontal leg that is bendable in a radial direction to accommodate relative movement between the inner liner and the outer liner.

14 Claims, 3 Drawing Sheets

COOLED DUAL WALL LINER CLOSEOUT

The U.S. Government may have certain rights in this invention in accordance with Contract Number N00019-02-C-3003 awarded by the United States Navy.

BACKGROUND OF THE INVENTION

This invention relates generally to a dual wall exhaust liner for a gas turbine engine. More particularly, this invention relates to a dual wall exhaust nozzle and/or duct closeout.

A gas turbine engine typically includes a plurality of turbine blades that transform energy from a mainstream of combustion gasses into mechanical energy that rotates and drives a compressor. The combustion gases exit the gas turbine engine through an exhaust nozzle. The exhaust nozzle assembly typically includes a hot side liner exposed to hot combustion gases and a cold side liner spaced radially apart from the hot side liner. The space between the hot side liner and the cold side liner defines a passage for cooling air. The cooling air is provided along the hot side liner to protect against the extreme heat generated by the combustion gases.

The hot side liner will often include a plurality of openings for communicating cooling air along an interior surface of the exhaust nozzle. The cooling air forms an insulating layer along the interior surface of the exhaust nozzle that protects the hot side liner. The hot side liner operates at a temperature much greater than that of the cold side liner. Accordingly, the cold side liner and hot side liner expand and contract differently in response to thermal conditions. The relative thermal expansions and contractions can generate stresses and strains in the hot side and cold side liner.

Further, it is known to provide for both stationary and articulating exhaust nozzle and ducts. Articulating exhaust nozzles and ducts allow for selectively directing combustion gases. The articulated exhaust nozzle and ducts includes several segments movable relative to each other. The interface between each segment requires that the air passage defined between the hot side and cold side liners be closed off. Further, it is desirable that the interface is cooled and sealed to contain combustion gases within the exhaust nozzle. Closing off the air passage at each interface joint complicates localized cooling between movable segments. The dynamic nature of the interface between movable segments creates a challenge to cooling of the hot side liner.

Accordingly, it is desirable to develop a dual wall exhaust liner closeout that accommodates differing thermal expansions and provides cooling airflow at an interface between movable segments of an exhaust nozzle and or duct assembly.

SUMMARY OF THE INVENTION

An example embodiment of this invention is an exhaust duct assembly including a dual wall exhaust liner having a closeout member that accommodates thermal expansion and provides for cooling a closeout and an interface between movable segments.

An example exhaust duct assembly includes a front liner, an intermediate liner assembly and a rear liner assembly. The front liner assembly is rotatable about a fixed mount point. The intermediate liner assembly is rotatable relative to the front liner assembly, and the rear liner assembly is rotatable relative to the intermediate liner. Each of the front, intermediate and rear liner assemblies, include an inner liner exposed to combustion gases and an outer liner spaced radially apart from the inner liner. An air passage is defined between the inner liner and the outer liner for cooling air utilized to insulate and cool the inner liner.

A closeout member is provided between the inner and outer liner and is riveted to the outer liner and welded or brazed to the inner liner. The closeout defines a portion of an air passage between the closeout member and the inner liner. Cooling air is injected into the interface between segments through the air passage defined by the closeout. The closeout member includes two bent portions disposed between a horizontal leg and an outer leg segment. The horizontal leg is bendable in a radial direction to accommodate relative movement between the inner liner and the outer liner. Although, the closeout is bendable, it also has a stiffness desired to maintain the structure and a spatial relationship between the inner and outer liner.

Accordingly, the exhaust liner of this invention includes a closeout that accommodates differing thermal expansions and provides cooling air flow to an interface between moveable segments.

These and other features of the present invention can be best understood from the following specification and drawings, the following of which is a brief description.

DETAILED DESCRIPTION OF THE PREFERRED EMBODIMENT

Figure 1:
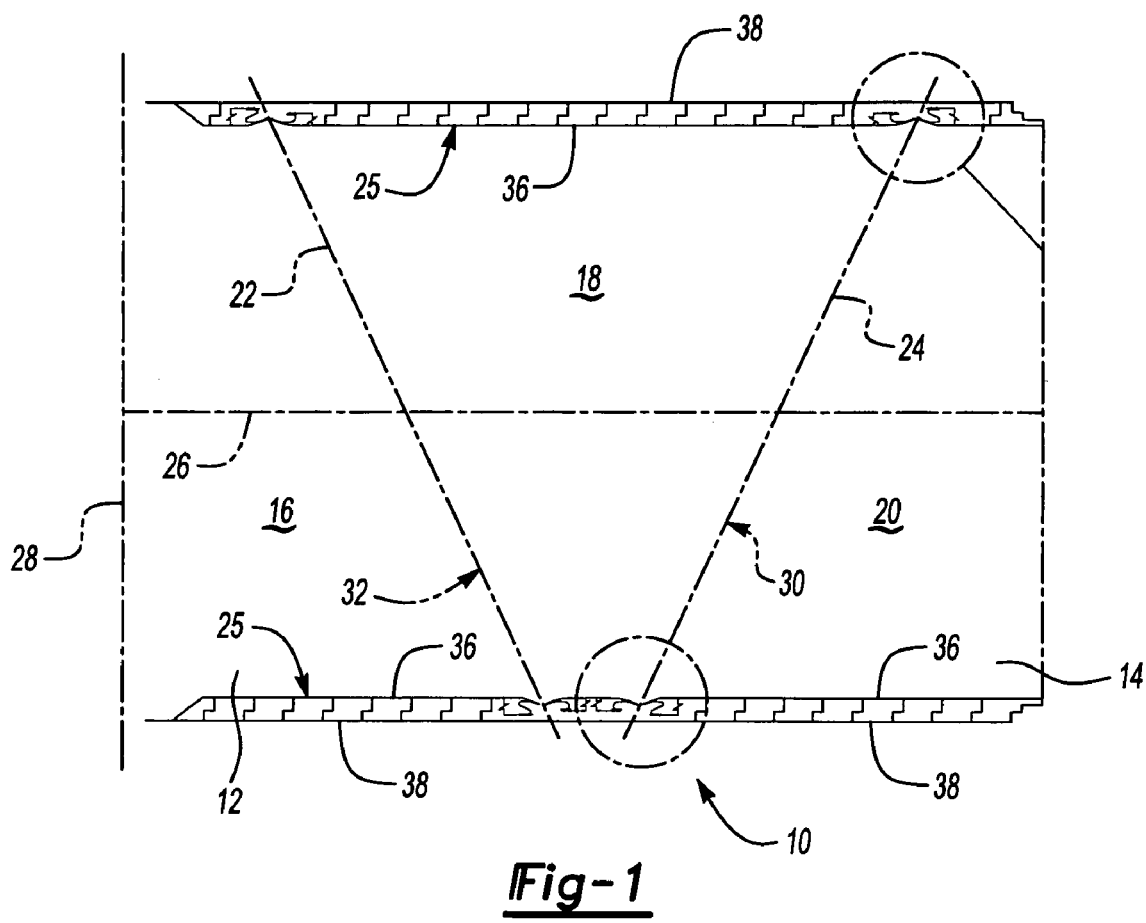
FIG. 1 is a schematic view of a portion of an exhaust duct assembly.

Referring to FIG. 1, an exhaust duct assembly 10 includes a forward duct 12 and an aft duct 14. Exhaust gases enter the exhaust duct assembly through the forward duct 12 and move through and are exhausted out the aft duct 14. The example exhaust duct assembly 10 includes a front liner 16, an intermediate liner 18 and a rear liner 20. The front liner 16 is rotatable about the axis 26 at the joint 28. The intermediate liner 18 rotates relative to the front liner 16, and the rear liner 20 rotates relative to the intermediate liner 18.

A first joint 32 is disposed along a first bearing plane 22 between the intermediate liner 18 and the rear liner 20. A second joint 30 is disposed along a second bearing plane 24. The first joint 32 and the second joint 30 are disposed at an angle relative to a plane perpendicular to an inner surface 25 of the exhaust duct assembly 10. Rotation of the front liner 16, intermediate liner 18 and rear liner 20 relative to each other provides for direction of combustion gases exiting the exhaust duct assembly 10.

Each of the front, intermediate and rear liner assemblies 16, 18, and 20 include an inner liner 36 exposed to the combustion gases and an outer liner 38 spaced radially apart from the inner liner 36. An air passage 42 defined between the inner liner 36 and the outer liner 38 provides cooling air utilized for insulating the inner surface 25. The configuration of the example articulating exhaust duct assembly 10 includes the first joint 32 and second joint 30. The liners 16, 18, 20 rotate relative to each other along the bearing planes 22, 24. The air passage 42 between the inner liner 36 and outer liner 38 is closed off at each joint 30, 32. A closeout member is provided between the inner and outer liner 36, 38 on either side of the joint interface 22, 24.

Figure 2:
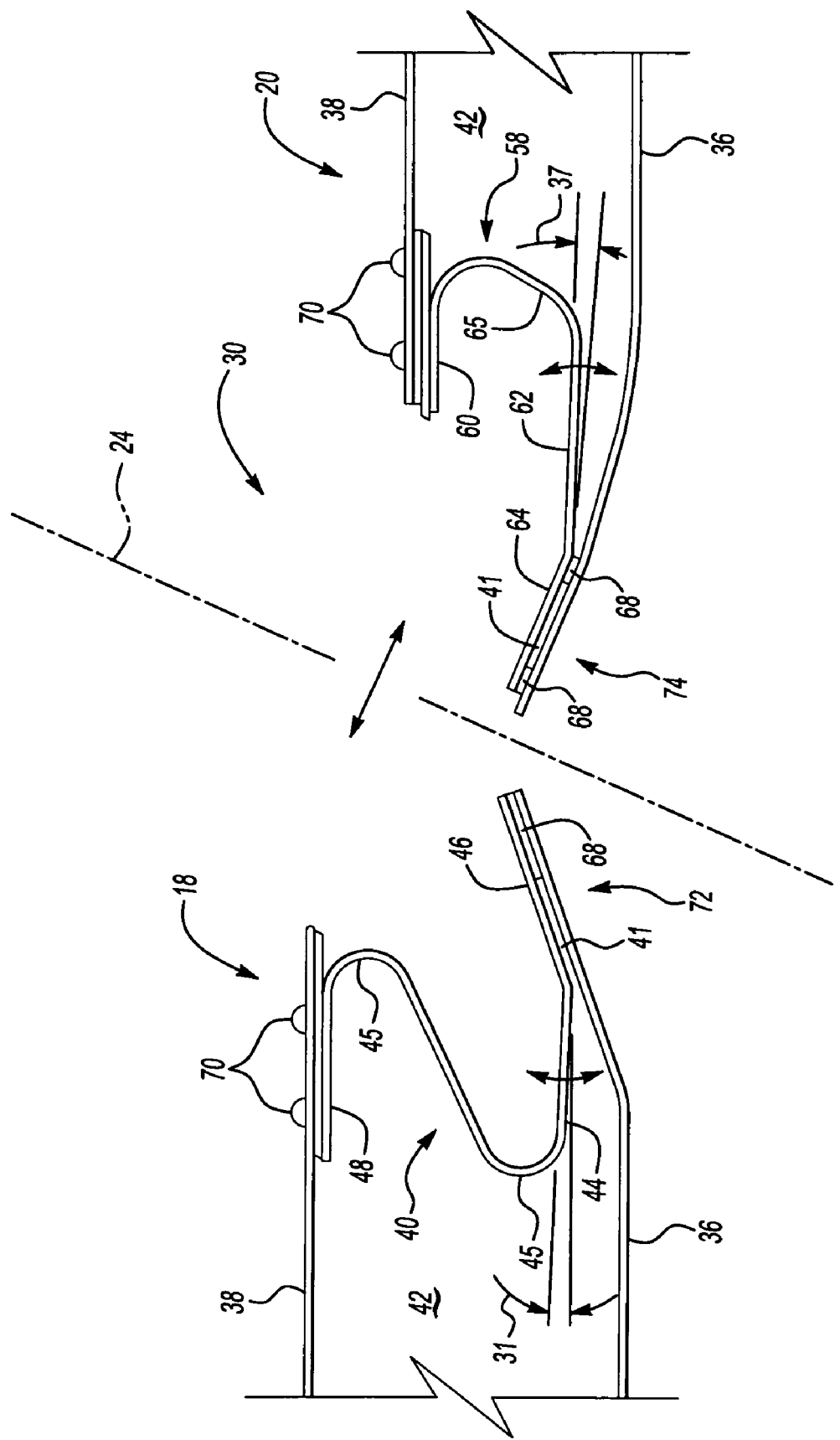
FIG. 2 is a schematic view of a joint assembly including an example closeout member according to this invention.

Referring to FIG. 2, the joint 30 includes a Z-shaped closeout member 40 within the intermediate liner 18 and a C-shaped closeout 58 within the rear liner 20. The Z-shaped closeout member 40 is riveted to the outer liner 38 and welded and/or brazed to the inner liner 36. Although, the illustrated example utilizes rivets 70 and a welded or braze attachment means, other fastening methods as are known are within the contemplation of this invention. The Z-shaped closeout 40 defines a portion of an end air passage 41 between the closeout member 40 and the inner liner 36. Air flowing through the end air passage 41 is injected into the joint 30 to provide cooling.

The inner liner 36 is exposed to combustion gases at elevated temperatures and expands and contracts differently than that of the outer liner 38. The closeout member 40 provides for relative movement between the inner liner 36 and the outer liner 38. The Z-shaped closeout member 40 includes two bent portions 45 disposed between a horizontal leg 44 and an outer leg segment 48. The bend portions 45 provide for bending of the horizontal leg 44 in a radial direction to accommodate relative movement between inner liner 36 and the outer liner 38. The horizontal leg 44 is disposed at an angle 31 relative to the inner liner 36. The angle 31 in the illustrated example is approximately 2 degrees. The angle 31 provides compliance in the horizontal leg 44 and improves manufacturability.

The C-shaped closeout member 58 disposed within the rear liner 20 at the first joint 30 includes a horizontal leg 62 that bends radially to accommodate differences in thermal expansion between the inner liner 36 and the outer liner 38. The horizontal leg 62 is disposed at an angle 37 relative to the inner liner 38. The C-shaped closeout member 58 also includes an outer leg segment 60 that is attached to the outer liner 38 and an inner leg segment 64 that is attached to the inner liner 38. The inner leg segment 64 includes tabs 68 that space the C-shaped closeout member 58 from the inner liner 36 to define the end air passage 41. The C-shaped closeout member 58 includes only a single bend 65 for accommodating bending of the horizontal leg 62. The C-shaped closeout member 58 is also used in the Z-shaped closeouts at the end of the aft liner. The use of only a single bend 65 accommodates a decrease in space between the inner liner 36 and outer liner 38.

The Z-shaped closeout member 40 and the C-shaped closeout member 58 close off ends of the intermediate liner 18 and the rear liner 20 at the first joint 30. The intermediate liner 18 is spaced apart from the rear liner 20 such that a gap between the two is formed to provide for relative motion.

The intermediate liner 18 and the rear liner include ends 72 and 74 that are angled radially outwardly from the inner surface 25. The outward angle of the ends 72 and 74 are not necessary for all applications and a worker versed in the art would understand how to advantageously configure the ends for a specific application. The outward angle of the ends 72 provides a non-stepped inner flow surface no matter what the relative position between the intermediate liner 18 and the rear liner 20. The rear liner 20 includes a corresponding oval shape that when rotated relative to the intermediate liner 18 results in a mismatched inner surface 25. The angled ends 72, 74 prevent a flat surface from jutting out into the main stream of combustion gases. As appreciated, the interface between the intermediate liner 18 and the front liner 16 includes a similar configuration.

Figure 3:
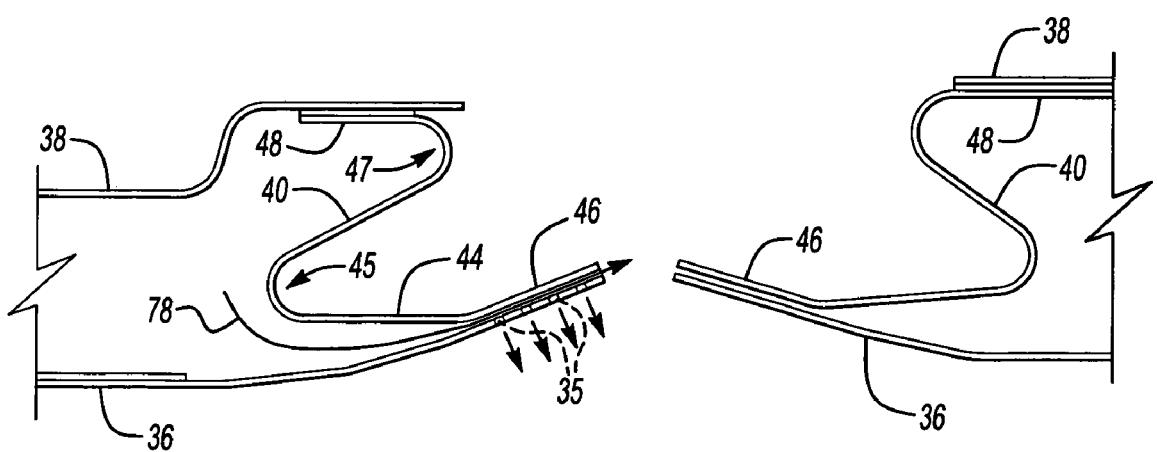
FIG. 3 is a schematic cross-sectional view of a joint assembly according to this invention.

Referring to FIG. 3, cooling air indicated at 78 flows within the air passage 42 defined between the inner liner 36 and outer liner 38. A worker versed in the art with the benefit of this disclosure would understand that many different means of providing cooling air 78 to the passage 42 are within the scope of this invention. The cooling air flows from the passage 42 to the end air passage 41 and out into the joint 30. The cooling air 78 also exits through a plurality of openings 35 in the inner liner 36 disposed adjacent the inner leg segment 46. Cooling air 78 that flows through the openings 35 forms an insulating layer for protecting the inner liner 36 from the extreme temperature of combustion gasses. The specific size and orientation of the openings 35 are determined to provide the desired magnitude and shape of cooling air flow along the inner surface 25.

Figure 4:
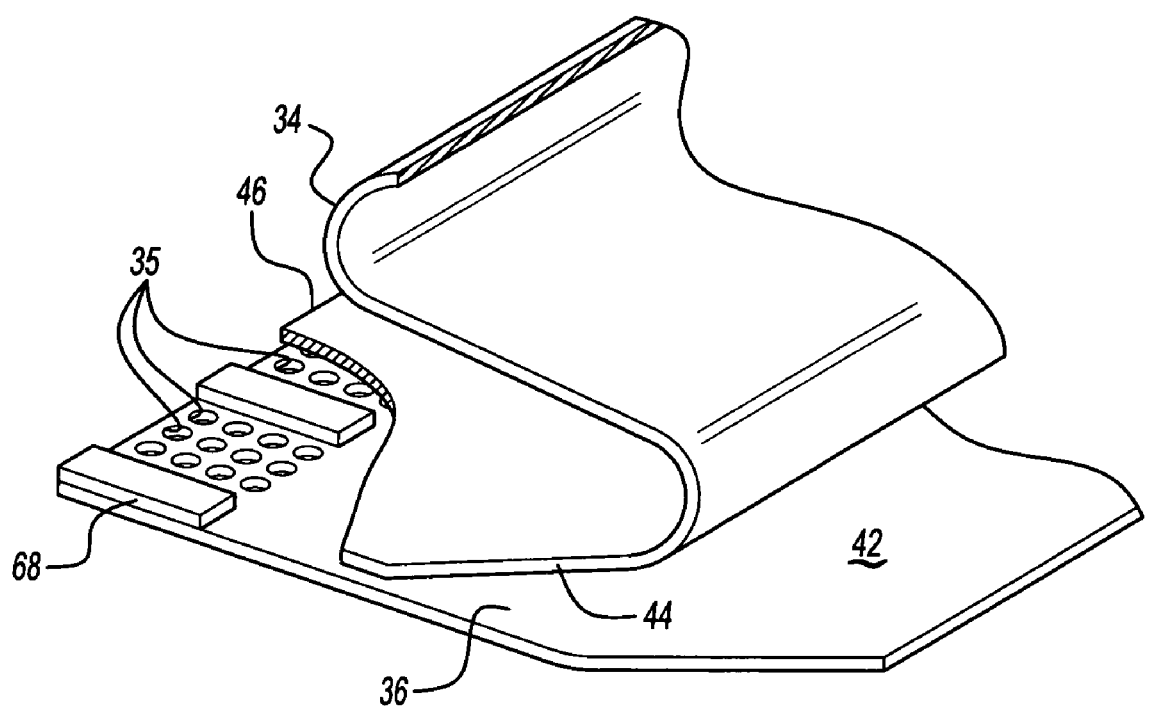
FIG. 4 is a perspective view of an interface between a closeout member and an inner liner according to this invention.

Referring to FIG. 4, a partial cut away is shown of the interface between the closeout member 40 and the inner liner 36. The inner leg segment 46 of the closeout member 40 is cutaway to illustrate the tabs 68 that space the closeout member from the inner liner 36 and the plurality of openings 35 that inject air along the inner surface 25 to generate the desired cooling and insulating layer.

Although the example exhaust duct assembly 10 illustrated and described provides for articulation along several bearing planes, a worker with the benefit of this disclosure would recognize the applicability to exhaust duct assemblies of various designs and configuration.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust liner assembly comprising:
   an inner liner;
   an outer liner spaced apart from said inner liner;
   a closeout member including a first bend segment in a first direction attached to said inner liner and a second bend segment in a second direction opposite the first direction attached to the outer liner providing for relative movement between said inner liner and said outer liner;
   at least two tabs including a first side attached to the first bend segment and a second side attached to the inner liner that spaces said closeout member a distance from said inner liner; and
   a plurality of openings disposed between the at least two tabs within the inner liner in communication with an air passage between the inner liner and the closeout member for injecting cooling air into an interface between movable sections of the liner assembly.

2. The assembly as recited in claim 1, wherein said tab spaces said inner liner said distance from said first bend segment to define an air passage between said inner liner and said closeout member for injecting cooling air into a joint of the exhaust liner assembly.

3. The assembly as recited in claim 2, wherein said plurality of openings in communication with said air passage for injecting cooling air through said inner liner onto a surface of the inner liner exposed to combustion gases.

4. The assembly as recited in claim 1, wherein said closeout member includes a horizontal segment disposed between said first and second bend segments and said inner liner, said horizontal segment movable radially for providing a compliant connection between said inner liner and said outer liner.

5. The assembly as recited in claim 4, wherein said horizontal segment is disposed at an angle relative to an inner surface of said inner liner.

6. The assembly as recited in claim 4, wherein said closeout member comprises an inner segment disposed adjacent an inner surface of said inner liner and an outer segment disposed adjacent an inner surface of said outer liner, and said first and second bend segments are disposed between said inner segment and said outer segment.

7. The assembly as recited in claim 6, wherein said closeout member comprises a generally Z-shaped member disposed between said inner liner and said outer liner.

8. The assembly as recited in claim 6, wherein said closeout member comprises a generally C-shaped member.

9. The assembly as recited in claim 1, comprising a front liner assembly, a rear liner assembly and an intermediate liner assembly disposed between said front liner assembly and said rear liner assembly, said first liner assembly, intermediate liner assembly and rear liner assembly movable relative to each other.

10. The assembly as recited in claim 9, comprising a first joint between said front liner assembly and said intermediate assembly and a second joint between said intermediate liner assembly and said rear liner assembly, wherein each of said first joint and said second joint are disposed at an angle relative to a central axis and include at least one closeout member.

11. The assembly as recited in claim 1, including a plurality of liner assemblies attached to each other and movable relative to each other.

12. A closeout member for an exhaust liner assembly having an inner liner and an outer liner, wherein said closeout member comprises:

a horizontal segment disposed at an angle relative to said inner liner;

a first bend segment disposed on a first end of the horizontal segment including a first leg portion extending from the first bend in a first direction and a second bend segment disposed on a second end of the horizontal segment including a second leg portion extending from the second bend in a second direction opposite said first direction; and a plurality of tabs attached to said second leg portion and said inner liner for spacing said second leg portion from said inner liner and such that the plurality of tabs define an air passage between the closeout member and the inner liner, the inner liner including a plurality of openings within the air passage between the plurality of tabs for communicating cooling air along a hot wall surface of the inner liner and cooling an interface between separate movable liner sections, wherein said closeout member defines a spaced apart relationship between said inner liner and said outer liner, and said horizontal segment provides for changes in said spaced apart relationship.

13. The assembly as recited in claim 1, wherein said inner liner and said outer liner assembly include a terminal edge and at least one of said first bend and said second bend extend to the terminal edge of one of said inner liner and said outer liner.

14. The closeout member as recited in claim 12, wherein at least one of said plurality of tabs are disposed at a terminal edge of one of the inner liner and the outer liner.

* * * * *